United States Patent
Amitay et al.

(10) Patent No.: US 7,752,208 B2
(45) Date of Patent: Jul. 6, 2010

(54) METHOD AND SYSTEM FOR DETECTION OF AUTHORS

(75) Inventors: Einat Amitay, Shimshit (IL); Sivan Yogev, Givat Haim Meuchad (IL); Elad Yom-Tov, Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 11/733,808

(22) Filed: Apr. 11, 2007

(65) Prior Publication Data

US 2008/0256093 A1 Oct. 16, 2008

(51) Int. Cl.
*G06F 7/00* (2006.01)
(52) U.S. Cl. .............. 707/749; 707/758; 707/999.101
(58) Field of Classification Search .......... 707/5, 707/9, 101, 758, 749, 999.101; 705/50
See application file for complete search history.

(56) References Cited

U.S. PATENT DOCUMENTS

| | | | | |
|---|---|---|---|---|
| 5,608,543 | A * | 3/1997 | Tamagaki et al. | 358/450 |
| 6,542,635 | B1 * | 4/2003 | Hu et al. | 382/173 |
| 6,591,405 | B1 * | 7/2003 | Doddi | 716/7 |
| 7,043,085 | B2 * | 5/2006 | Takayama | 382/228 |
| 7,567,960 | B2 * | 7/2009 | Wei et al. | 707/5 |
| 2004/0243631 | A1 | 12/2004 | Walker et al. | |
| 2005/0222972 | A1 * | 10/2005 | Mishra et al. | 707/1 |
| 2006/0095404 | A1 | 5/2006 | Adelman et al. | |
| 2006/0230039 | A1 | 10/2006 | Shull et al. | |
| 2007/0078846 | A1 * | 4/2007 | Gulli et al. | 707/5 |
| 2007/0094245 | A1 * | 4/2007 | Vigil | 707/4 |
| 2007/0192308 | A1 * | 8/2007 | Wei et al. | 707/5 |

OTHER PUBLICATIONS

Y. Sure et al., "The Semantic Web in one day", *IEEE Intelligent Systems*, v 20, n 3, May/Jun. 2005, p. 85-87.
S. Garlatti et al., "A flexible composition engine for adaptive Web sites", *Adaptive Hypermedia and Adaptive Web-Based Systems*. Third International Conference, AH 2004. Proceedings (Lecture Notes in Comput. Sci. vol. 3137), 2004, 115-25.
R. Cilibrasi et al. "Clustering by Compression", IEEE Transactions on Information Theory, Vo. 51, No. 4, Apr. 2005, 1523-1545.
A.K. Jain et al., "Data Clustering: A Review", IEEE, 1996 (Reprinted in ACM Computing Surveys, vol. 31, No. 3, 1999.

* cited by examiner

*Primary Examiner*—Miranda Le

(57) ABSTRACT

A method and system are provided for detection of authors across different types of information sources such as across documents on the Web. The method includes obtaining a compression signature for a document, and determining the similarity between compression signatures of two or more documents. If the similarity is greater than a threshold measure, the two or more documents are considered to be by the same author. Scored pairs of documents are clustered to provide a group of documents by the same author.

The group of documents by the same author can be used for user profiling, noise reduction, contribution sizing, detecting fraudulent contributions, obtaining other search results by the same author, or mating a document with undisclosed authorship to a document of known author.

14 Claims, 8 Drawing Sheets

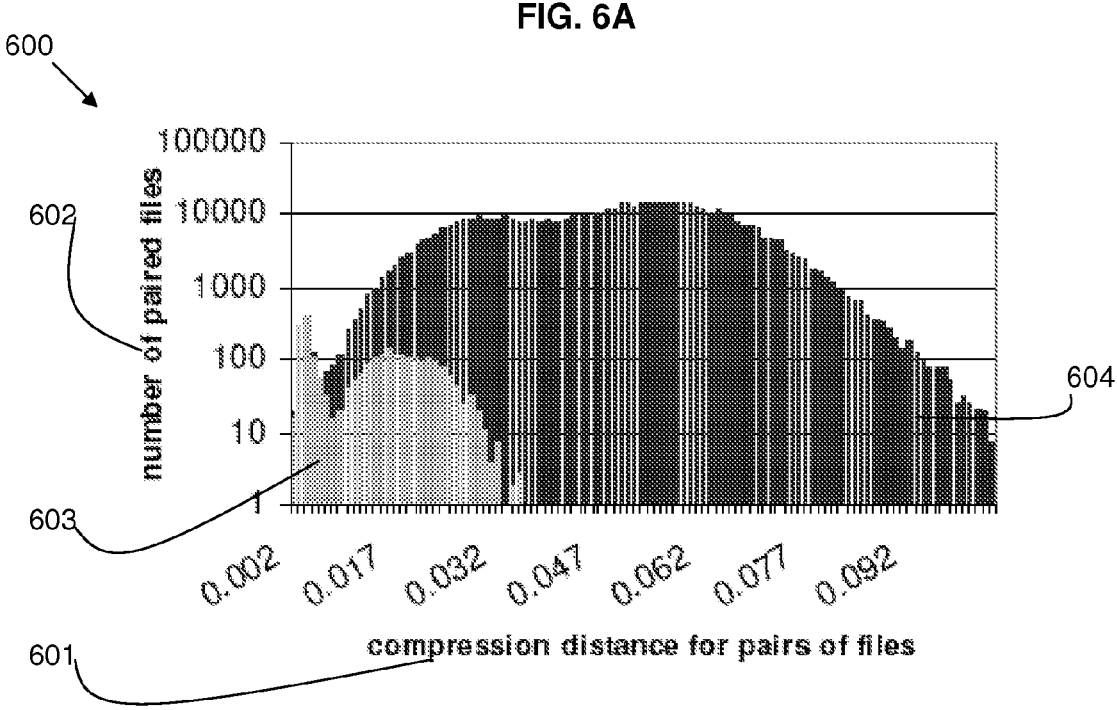
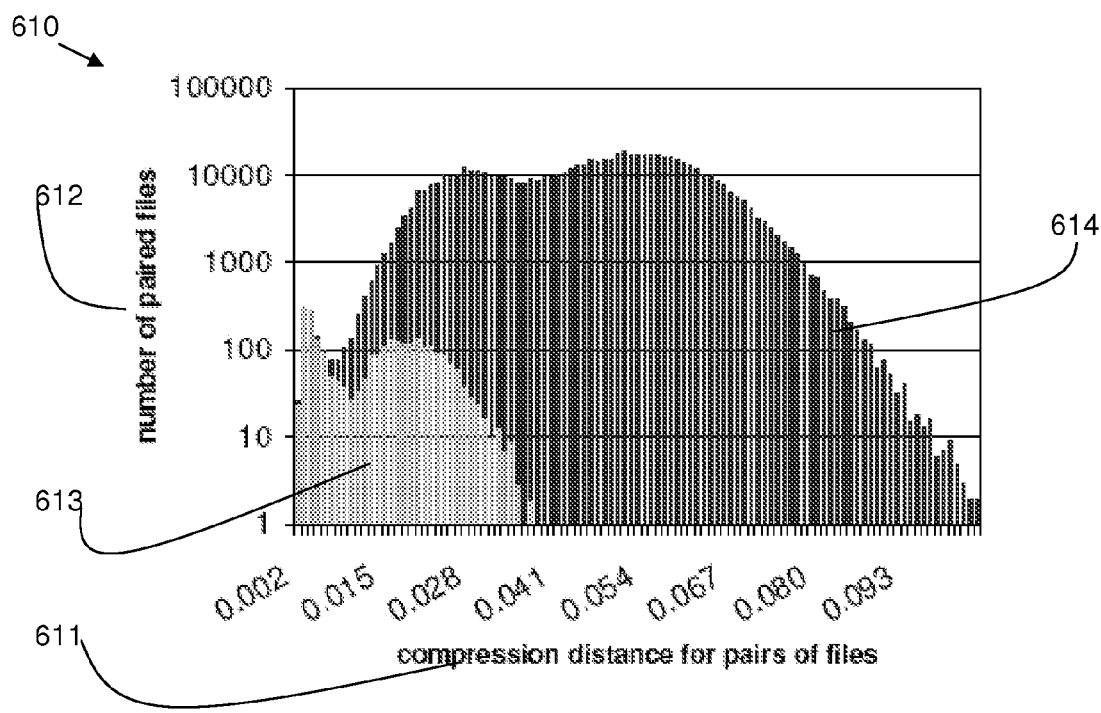

METHOD AND SYSTEM FOR DETECTION OF AUTHORS

FIELD OF THE INVENTION

This invention relates to the field of detection of authors. In particular, the invention relates to detection of information across different types of information sources (such as across the Web) produced by the same author.

BACKGROUND OF THE INVENTION

There are currently hundreds of millions of people contributing content to the Web. They do so by rating items, sharing links, photos, music and video, creating their own webpage or writing them for friends, family, or employer, socializing in social networking sites, and blogging their daily life and thoughts. Of those who author Web content there is a group of people who contribute to more than a single Web entity, be it on a different host, on a different application or under a different username. This group is referred to as Serial Sharers. For example, good examples of people who produce several types of content are university professors and students who maintain their own personal Web page on a different host and also a page on their faculty site.

Some authors contribute more than others and their opinion is heard multiple times in multiple contexts. They not only contribute content to the Web but do so on several different hosts and in various different forms, be it by tagging public material, through their homepage, by blogging, by contributing portions to open content websites, and the likes. These authors are not spammers in the trivial sense. Most have no intention of manipulating search results, or influencing worldwide information. They simply enjoy utilizing everything the virtual world offers.

Knowing that the same person authored a collection of not trivially-related pages may be used to enhance and create new applications where knowledge about users is essential. Analyzing and using information about a single author which is extracted from different sources may add new dimensions to user information, such that is not easily available today.

The problems of Duplicate Page Detection and Mirror Site Detection use multi-dimensional aspects of the page to describe duplication in features such as size, structure, content, similar naming of the URL, etc. Duplication and mirroring are artifacts of hosting similar information on different machines or hosts in order to facilitate access to those pages in a desired context (e.g. hosting a mirror of a software library on a public university server).

Author Detection is somewhat similar in the sense that information written by the same author, such as a user profile or a homepage, is sometimes partially duplicated by mentioning similar topics, expressing similar opinions, repeating the same links or usernames, etc. However, sometimes each page written by the same author comprises exclusively unique segments and there are authors who make a clear distinction between pages about different aspects of their life, for example, their hobbies and their professional pages.

Studies have explored the field of author detection or author attribution in restricted domains. For instance, machine learning and shallow parsing methods have been used to detect authors in various collections of newsgroups. Using similar methods, short messages on online message boards have been clustered for detection of users who mask their identity.

These studies all look at very controlled and contained domains. However, to solve the problem of author detection on the Web it is very costly to employ methods of shallow parsing and machine learning for several reasons. First, feature extraction is a costly process which requires analyzing many aspects of the page and then producing large data structures for storing such information. Secondly, feature extraction in such an uncontrolled environment cannot scale up.

Rao J. R., Rohatgi P. (2000), "Can pseudonymity really guarantee privacy?" In Proceedings of the 9th USENIX Security Symposium, pages 85-96, tries to align authors from both mailing lists and newsgroups. They report that the stylistic conventions practiced by users of the different media resulted in very poor detection rates with learning and shallow parsing methods.

US 2007/003,3168 discloses a method of receiving multiple content items from a corpus of content items and ranking the content items by using an agent rank. The method includes receiving digital signatures each made by one of multiple agents, each digital signature associating one of the agents with one or more of the content items. A score is assigned to a first agent of the multiple agents, wherein the score is based upon the content items associated with the first agent by the digital signatures. This disclosure provides a method of providing an author signature, but this does not address the problem of Web content without such author signature.

SUMMARY OF THE INVENTION

An aim of the present invention is to perform author detection over several media types such as blogs, user profiles, personal tagging spaces, professional and personal homepages and any other identifiable personal information that can be attributed to a single author.

According to a first aspect of the present invention there is provided a method for detection of authors across different types of information sources, comprising: providing a collection of documents from different types of information sources; obtaining a compression signature for a document; determining the similarity between compression signatures of two or more documents; and determining that, if the similarity is greater than a threshold measure, the two or more documents are by the same author.

According to a second aspect of the present invention there is provided a computer program product stored on a computer readable storage medium for detection of document authors, comprising computer readable program code means for performing the steps of: providing a collection of documents from different types of information sources; obtaining a compression signature for a document; determining the similarity between compression signatures of two or more documents; and determining that, if the similarity is greater than a threshold measure, the two or more documents are by the same author.

According to a third aspect of the present invention there is provided a system for detection of authors across different types of information sources, comprising: a collection of documents from different types of information sources; means for obtaining a compression signature for a document; means for determining the similarity between compression signatures of two or more documents; and means for determining that, if the similarity is greater than a threshold measure, the two or more documents are by the same author.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIGS. 6A and 6B are histograms showing experimental results in accordance with the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
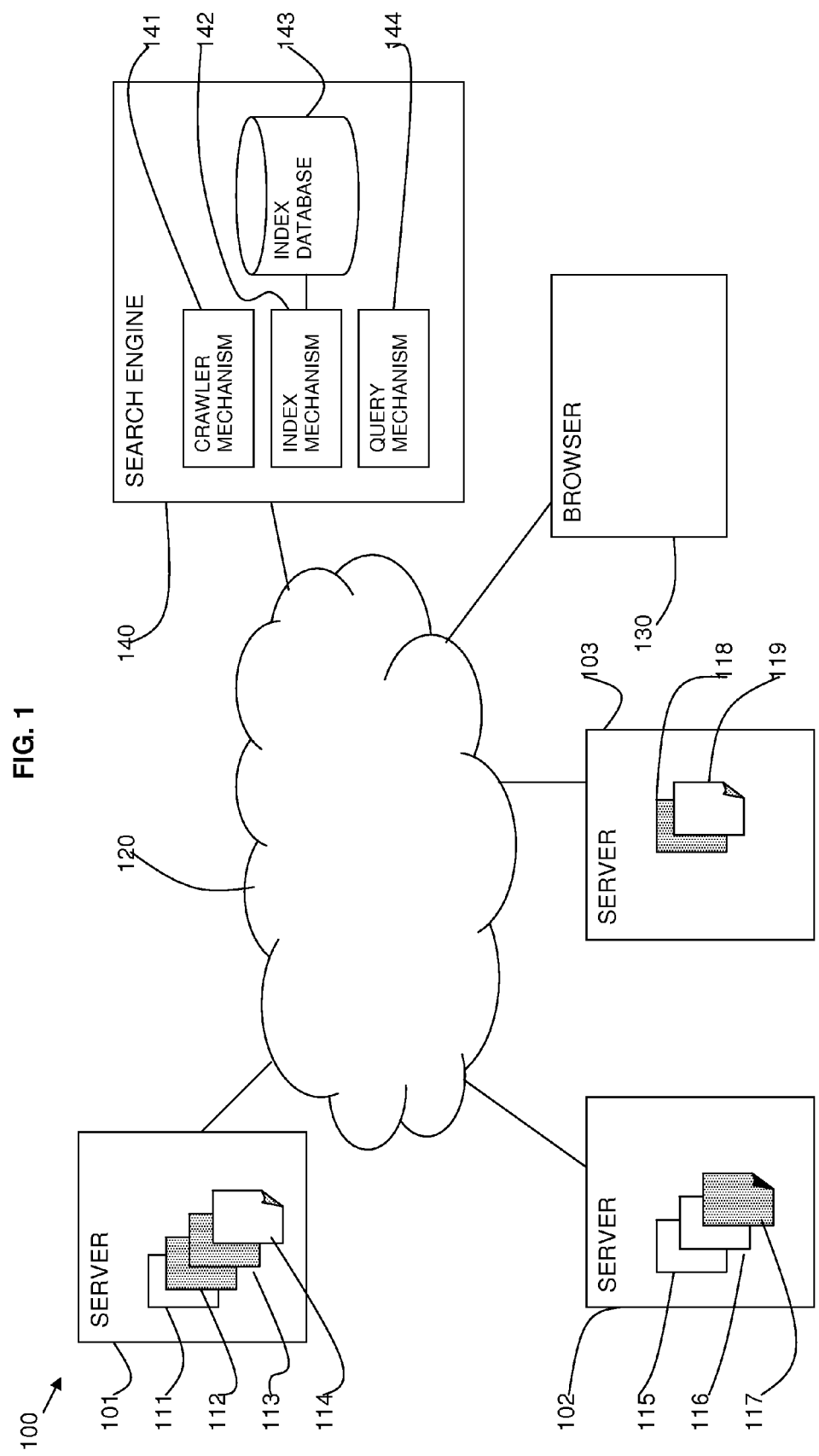
FIG. 1 is a schematic diagram illustrating the distribution of information across the Web.

Referring to FIG. 1, a schematic diagram illustrates a basic Web architecture 100. Multiple servers 101-103 host documents 111-119 which are accessible across the Web via network communication 120. The term document is used to include single pages or multiple pages of websites, files, images, or other forms of documents. A client system may include a browser application 130 of accessing the documents 111-119 hosted by the servers 101-103. A search engine 140 may be used by a client browser 130 to find documents 111-119 of interest to the client by use of keywords.

A search engine 140 generally includes a crawler mechanism 141 for gathering information from servers 101-103 via the network 120, an index mechanism 142 for creating an index or catalogue of the gathered information in an index database 143, and a search query mechanism 144 for retrieving the documents 111-119 in response to a user query.

The index database 143 references URLs (Uniform Resource Locator) of documents in the servers 101-103 with information extracted from the documents. The index database 143 may store cached compressed version of the documents 111-119.

The search query mechanism 144 receives a query request from a client via the network 120, compares it to the entries in the index stored in the database 143 and returns the results to the client. When the client selects a link to a document, the client's browser 130 is routed straight to the server 101-103 which hosts the document 111-119.

The documents 111-119 may include multiple documents 112, 113, 117, 118 which are generated by the same author. These documents 112, 113, 117, 118 may be on different host servers 101-103, on different applications, and may be under different usernames. For example, the documents 112, 113, 117, 118 by the same author may be the author's own website, a blog, the author's employer's website, a photo sharing website, a website to which the author has contributed open content, a website in which the author has added a rating for a product or service, a forum website, etc.

Figure 2:
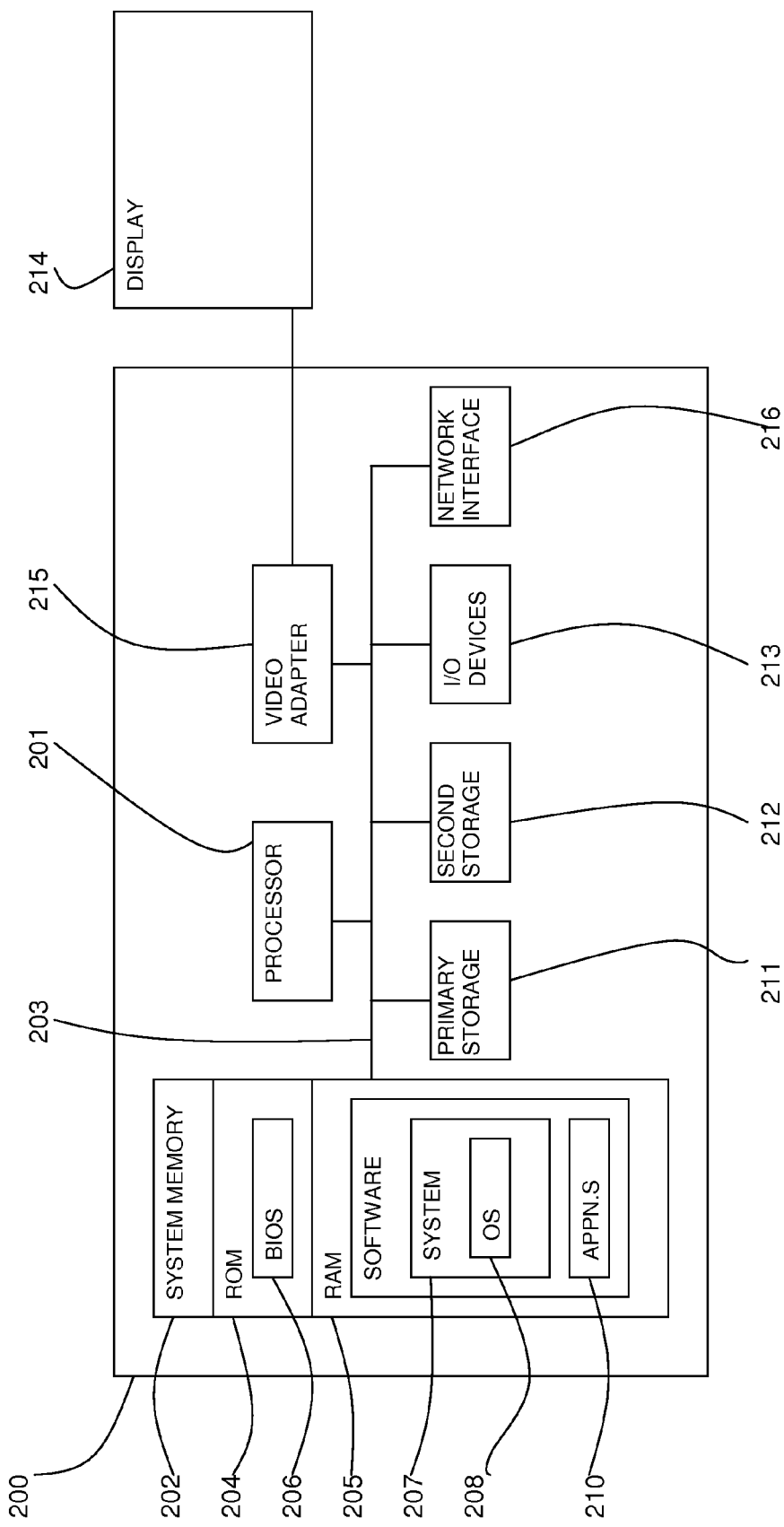
FIG. 2 is a block diagram of a computer system in which the present invention may be implemented.

Referring to FIG. 2, an exemplary system for implementing a server system, a search system, and a client system includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices. Output devices may include speakers, printers, etc. A display device 214 is also connected to system bus 203 via an interface, such as video adapter 215.

A method and system are described in which authorship is detected across Web documents, by using compression of the documents. The described method applies a detection-by-compression algorithm to compute the compression distance for two or more documents in a collection of pages. It is possible to determine authorship wherein a document has a single author, based on such a distance as it is assumed that the closest scoring documents have been written by the same author. The documents can then be chained or clustered into document groups, by author.

A compression distance can be calculated for a document pair where in the documents are both of unknown author. If a document's author is known, a document of unknown author can be assumed to be by the same author as the known document if the compression distance between the two documents is similar. Several documents by a known author could also be compared to a document which is suspected to be written by the same author. The compression distance may be calculated between the unknown document and an aggregation of the documents of known author.

Using compression instead of textual and structural feature extraction is advantageous as there are so many ways in which two pages written by the same author can be similar. They may share themes, content terms, relative URL path, linking patterns, page layout, color scheme, image filenames, etc. Encoding such a feature set for a collection of pages is a very subjective task. If the feature set is large enough to describe all possible aspects its usage will not scale to large collections such as the Web.

Compression captures all of the features that repeat themselves in a single page and treats them as information redundancy. So it may capture HTML structure redundancies as well as stylistic redundancies. The final size of the compressed page is determined by the repeating patterns detected in the compression. By using compression for author detection it is hypothesized that every author has a unique compression signature that is similar across all the pages of the same author.

Search engines use compression in storing cached versions of documents. In order to calculate the compression distance for each pair of documents, both files need to be compressed together. This may require candidate document pairing that will allow search engines to reduce the number of paired files to be compressed. Such solutions may take usernames found in the URL as a first comparison candidacy. Similarly, solutions may be found in computing the probabilities of people co-publishing in certain places, for instance, if a person publishes in a social tagging website they are likely to also have a page in a blog hosting website, etc.

The Normalized Compressor Distance (NCD) has been used by Cilibrasi R. & Vitanyi P. M. B. (2005). Clustering by compression. IEEE Transactions on Information Theory, 51(4):1523-1545.) as a tool for detecting similarity between files or strings. Given a compressor C and two files x, y, define:

$$NCD(x, y) = \frac{C(xy) - \min\{C(x), C(y)\}}{\max\{C(x), C(y)\}}$$

Where C(x), C(y) and C(xy), are the bit-wise sizes of the result sequences when using C to compress x, y and the concatenation of x and y, respectively. NCD assesses the similarity between a pair of files by measuring the improvement achieved by compressing an information-rich file using the information found in the other file.

An example embodiment of the described method uses a variation of NCD which is referred to as two-sided NCD (2NCD), with the following definition:

$$2NCD(x, y) = \frac{[C(xy) - C(x)][C(xy) - C(y)]}{C(x)C(y)}$$

2NCD measures separately how much the compression of each of the documents is improved by using the information included in the other document. The compression distance assigned to the document pair is the product of these two measurements.

The compression distances of document pairs can be grouped by chaining or clustering methods.

For example, a chaining example is as follows:

Given documents A1, A2, A3, A4 and B1, B2, B3, B4 and the following distances between pairs of documents:

A1→A3=0.001
B4→B2=0.0011
B3→B2=0.00111
A2→A3=0.0012
A4→A1=0.0013
A1→A2=0.0015
A3→A4=0.0016
A1→B1=0.0037
A4→B3=0.0042
Threshold 0.005
A3→B4=0.0065 (above threshold)

The documents A1, A2, A3 and A4 can be well chained and assumed to be by the same author. The documents B2, B3 and B4 are weakly connected.

Clustering is the classification of objects into different groups, so that the data in each group share some common trait, in this case proximity according to the compression distance measure. Clustering may also be applied by certain features found in the documents (for example, by features extracted from their original URL) after ranking them according to their paired distance. For example, if there are three files that were calculated to be similar and their original URLs are:

www.host1.com/username/miki
www.host2.com/user/miki
www.host3.org/~miki

Then the term "miki" may be used to support the findings through the distance calculations.

Figure 3:
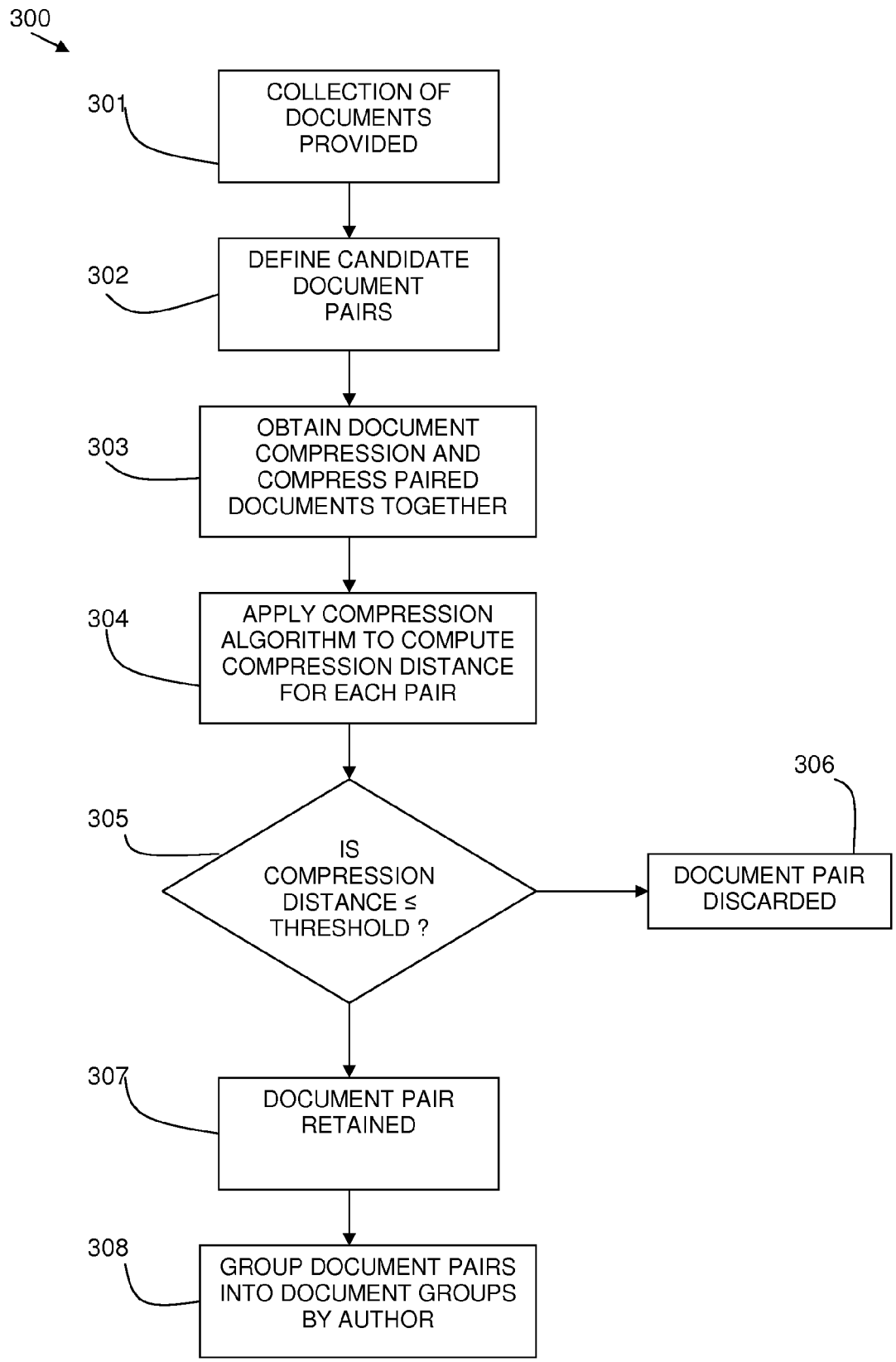
FIG. 3 is a flow diagram of a method in accordance with the present invention.

Referring to FIG. 3, a flow diagram 300 is provided of the general method. The flow diagram 300 starts with the provision 301 of a collection of documents (such as the Web). The candidate document pairs are defined 302.

The compression of each of the paired candidate documents are obtained and the paired candidate documents are compressed together 303. The two-sided compression algorithm is applied 304 to determine the compression distance for each pair.

It is then determined 305 if the compression distance for a candidate pair is less than a predefined threshold distance. The threshold may be a dynamic threshold based on the average of all the distances. For example, it may be known empirically that 20% of a collection are probably good matches and the rest are not. By ranking all the distances, it can be determined dynamically where the 20% threshold falls in terms of a fixed value.

If the compression distance is greater than the threshold, the pair of documents are considered to be by different authors and the document pair is discarded 306. If the compression distance is less than or equal to a threshold distance, the pair is considered to be by the same author and retained 307.

The information about non-matching pairs may be preserved for future comparisons or for use in the chaining step below. It may also be retained in order to maintain a ration of those documents that matched against those do not in a given collection.

The pairs of documents which are considered to be by the same author are chained or clustered 308 into document groups considered to be by the same author.

The above method can be used to obtain a set of documents over different types of information sources (such as over the Web) authored by the same single author. Such a set of documents is very useful in a wide range of applications. For example, the set of documents can be used in the following applications:

User profiling (for personalization, expertise location);
Noise reduction (spam detection, "democratization" of results);
Sizing (Web site contributions, comparison of community contributions);

Detecting fraudulent contributions (spam in ratings and reviews);

Introducing a button of "more by this author" in the search results;

Matching a page from a known author to a page by the same author but without authorship indication.

An exemplary embodiment of the described method and system is provided in the form of a search system in which the determination Web documents by the same author is applied to a search query in order to provide a user with an option to access documents by the same author as documents retrieved in a search.

Figure 4:
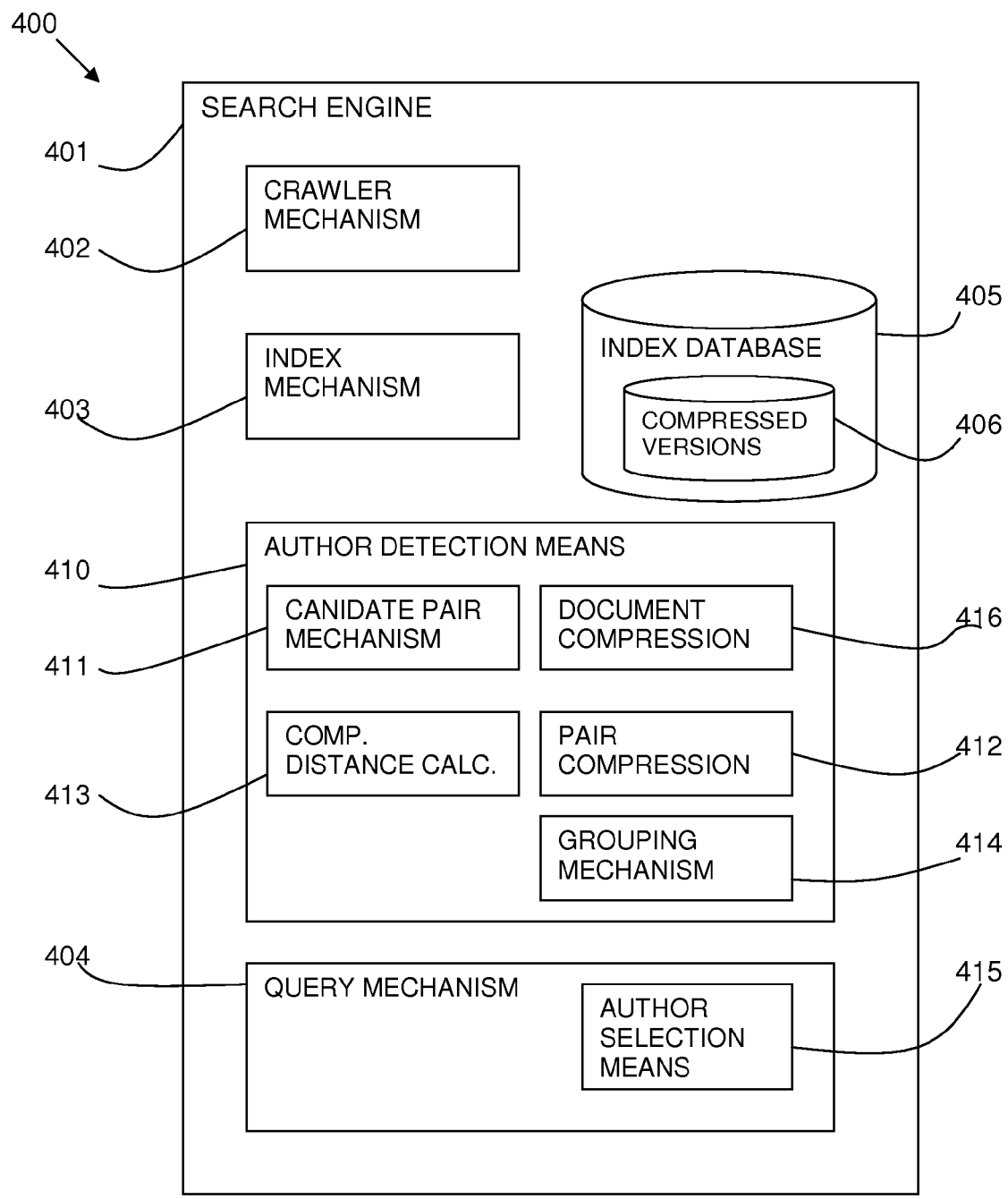
FIG. 4 is a block diagram of a search system in accordance with the present invention.

Referring to FIG. 4, an embodiment of the described system is provided in the form of a search system 400. The search system 400 includes a search engine 401 with a crawler mechanism 402, an index mechanism 403, and a query mechanism 404. The search engine 401 includes an index database 405 for storing indexed data relating to Web documents. The index database 405 includes cached versions 406 of documents. The cached versions 406 of documents may be compressed documents.

The search engine 401 of the described system includes an author detection means 410 including a candidate pair provision mechanism 411, a document compression mechanism 416, a pair compression mechanism 412, a compression distance calculation mechanism 413, and an author grouping mechanism 414. The document compression mechanism 416 may use the cached compressed versions 406 of documents from the index database 405.

The query mechanism 404 includes a selection means 415 for viewing documents by a same author as a returned document.

Figure 5:
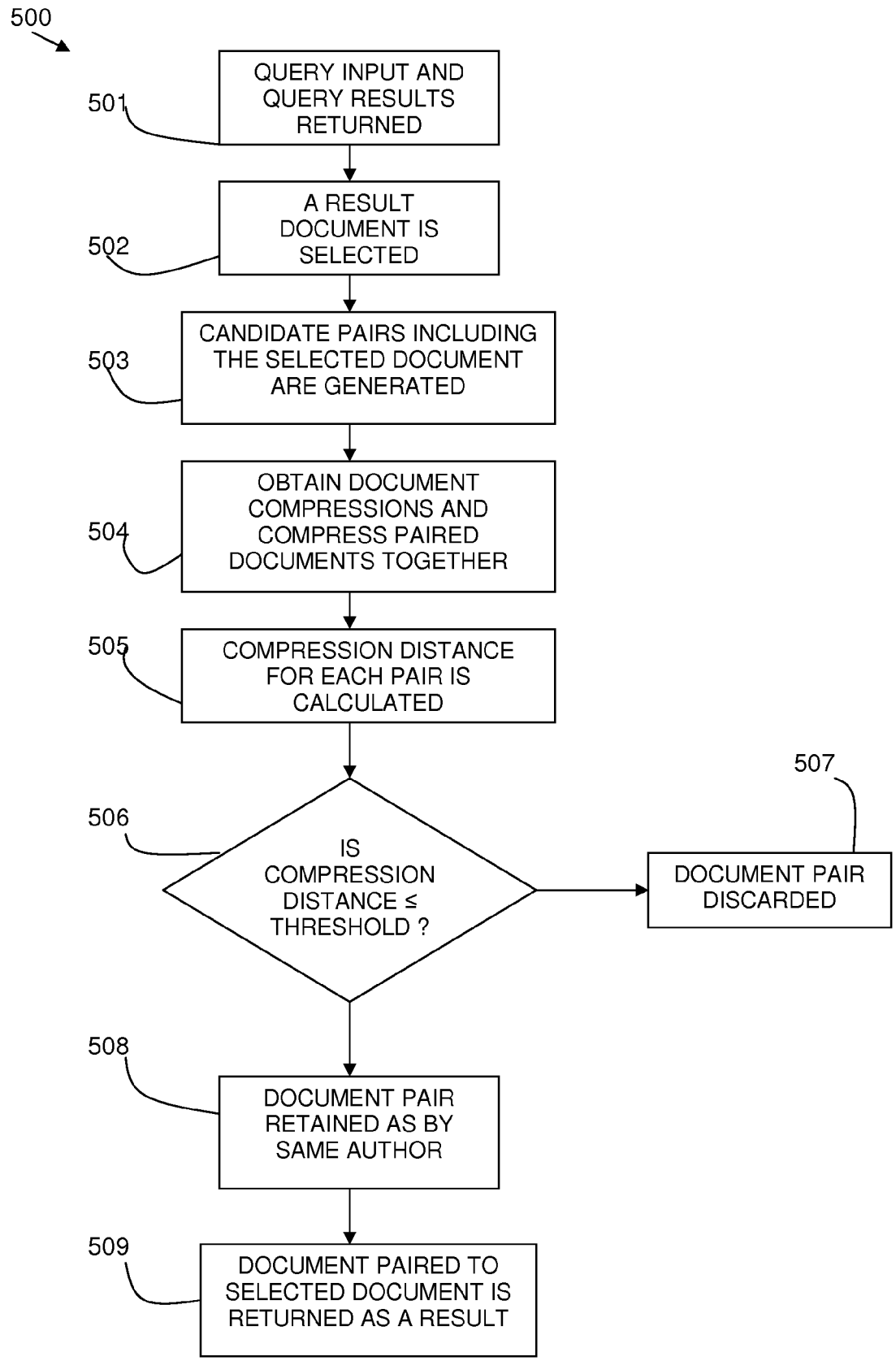
FIG. 5 is a flow diagram of a method in accordance with the present invention used in the context of a search.

Referring to FIG. 5, a flow diagram 500 is shown of the described method applied to a search engine. A query is input into a search engine and a set of results is returned 501. A result document is selected 502. The candidate pairs including the selected document are generated 503. The document compressions are obtained, which may use the compressed cached version of documents in the search index, and candidate pairs are compressed together 504. The compression distance algorithm is applied 505 to obtain the compression distance for each candidate pair.

It is determined 506 if the compression distance for a candidate pair is less than or equal to a predefined threshold. If the compression distance for a candidate pair is above the threshold, the pair is discarded 507. If the compression distance for a candidate pair is below or equal to the threshold, the pair is retained 508. The document paired to the original query result document is returned 509 as a result of by the same author.

Experimental Results

An experiment has been carried out to test whether authors can be detected using only their compression signature, even across different types of writing styles and Web publication types. A collection of nearly 10,000 pages was used including blogs, user profiles, social book marking websites, photo collections, open content style pages, personal homepages, etc., written by 2201 different authors.

The collection stored only authors who had at least two pages authored by them hosted on two different hosts. Removed from the collection were those who had simply duplicated the content of one site and put it up as a mirror on another host (assuming this will be revealed by simple duplicate- or mirror-site detection).

The files were left intact, including all HTML and scripts. This was done in order to achieve realistic results that could potentially be applied to any collection of Web pages without any preprocessing. Also, removing HTML markup may have affected the detection of structure and layout characteristics unique to individual authors.

Common links were used as a baseline comparison. It has been found that link co-citation yields the best results for topic similarity between documents, therefore the baseline comparison in the experiment was chosen as link co-occurrence between each pair of documents. As a first step to test the existence of link co-occurrence between sets of documents known to be produced by the same author the amount of shared links for each set was calculated. It turned out that about 60% had common links while 40% had no common links between the different pages they have written. The most prolific author had 1283 links appearing repeatedly in the set of the pages he authored.

Motivated by efficiency considerations, the collection was sampled and two smaller sets extracted comprising 1043 documents for the first set and 1109 documents for the second set. The sampling was arbitrary and was designed to sample authors rather than pages. All the pages written by the same author were grouped together and the two samples did not include the same author twice. These samples have been worked with to compare each possible pair of documents using link co-occurrence and compression distances. For each document, its shared links were computed with every other document in the sample. For each such pair, their compression distance was calculated by first compressing each document on its own and then compressing the pair together. For the compression task, an open source free compressor was used with a relatively large buffer which is advantageous for Web pages.

The results of the compression distances computed for each document pair (using 2NCD) are shown in FIG. 6A and FIG. 6B. FIGS. 6A and 6B are histograms 600, 610 of the compression distances computed for each pair of documents 601, 611 against the number of paired files 602, 612. FIG. 6A shows the histogram 600 for the results of the first sample consisting of 1043 documents. FIG. 6B shows the histogram 610 for the results of the second sample consisting of 1109 documents. The paler grey bars 603, 613 represent true document pairs that belong to the same author. The darker grey bars 604, 614 represent false document pairs that were written by different authors. For both samples, it is clear that the paler grey bars accumulate on the left-most side of the charts 600, 610.

Figure 7A:
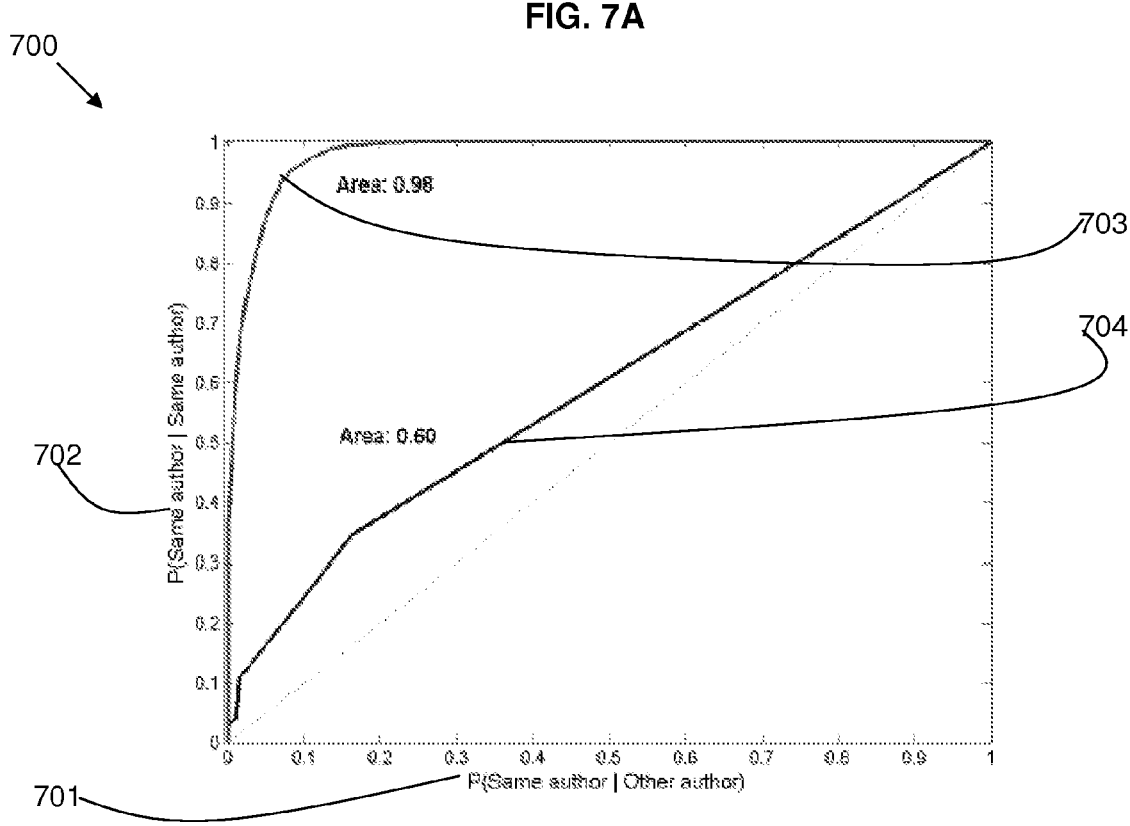
FIGS. 7A and 7B are Receiver Operating Characteristics (ROC) curves showing experimental results in accordance with the present invention.
Figure 7B:
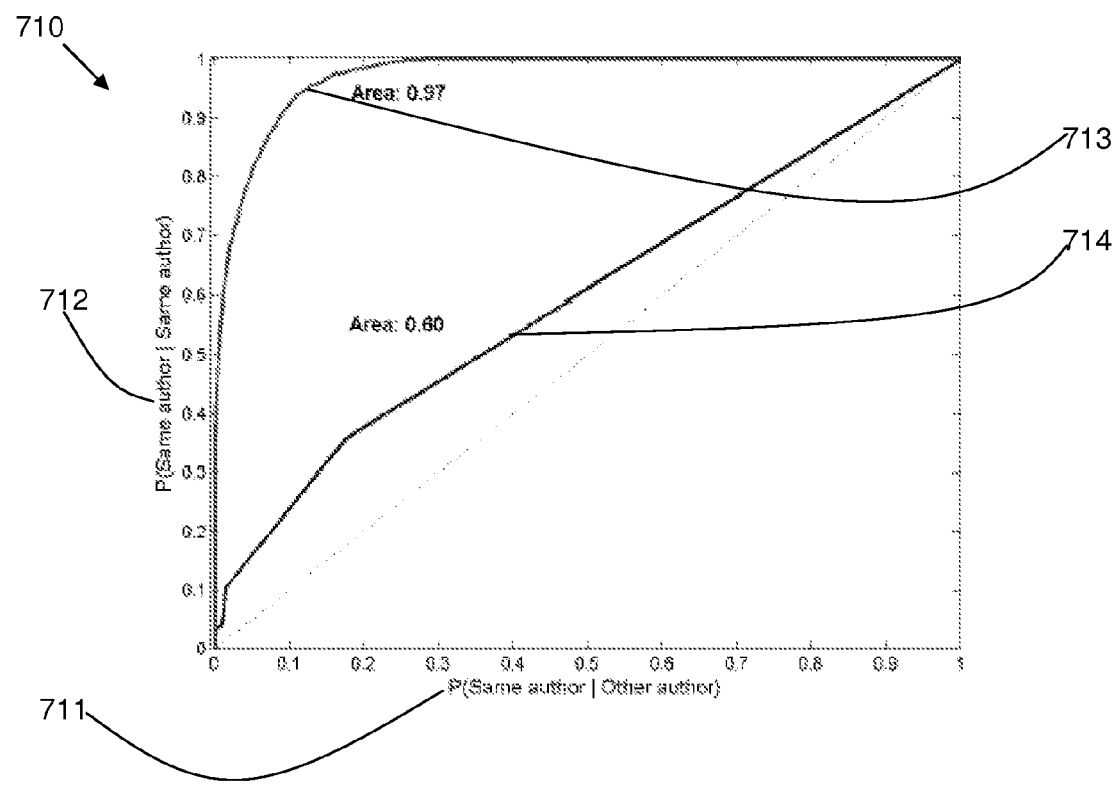

In order to visualize the results of the compression-based similarity, a graph known as the Receiver Operating Characteristic (ROC) curve was generated as shown in FIGS. 7A and 7B. This curve 700, 710 plots the sensitivity versus the specificity of a system. In this case, each point on the curve plotted in an ROC is a threshold similarity. The horizontal axis 701, 711 of the ROC curve 700, 710 represents the probability that two pages that have a compression similarity index smaller than the threshold will not be from the same author. The vertical axis 702, 712 shows the probability that two pages which have a compression index smaller than the threshold will indeed be from the same author. The ideal curve would touch the upper left corner of the graph, while a random decision will result in a curve from the bottom left corner to the upper right-hand corner. An ROC is usually parameterized by the area under the curve, where 0.5 represents random decision and 1.0 an ideal system.

FIGS. 7A and 7B show the results for the two samples of compression-based similarity 703, 713 compared to using the number of co-occurring links 704, 714 as a method for detecting authorship. The area obtained by the latter method is 0.6, only slightly better than chance. Compression based similarity achieves an area of greater than 0.97, which is close to the ideal detector. Thus, the compression-based similarity offers an effective method for identifying authorship.

All the scored pairs are then chained or clustered together to create a set of pages produced by the same author. In order to cluster the pairs of documents, a naïve clustering algorithm was used as follows:

Given a distance function D and a threshold t, let G=(V, E) be a graph whose vertices are all of the documents in a collection, with an edge connecting every pair of documents (x, y) such that $D(x, y) \leq t$. A cluster of single-author documents is a connected component in G.

Figure 8:
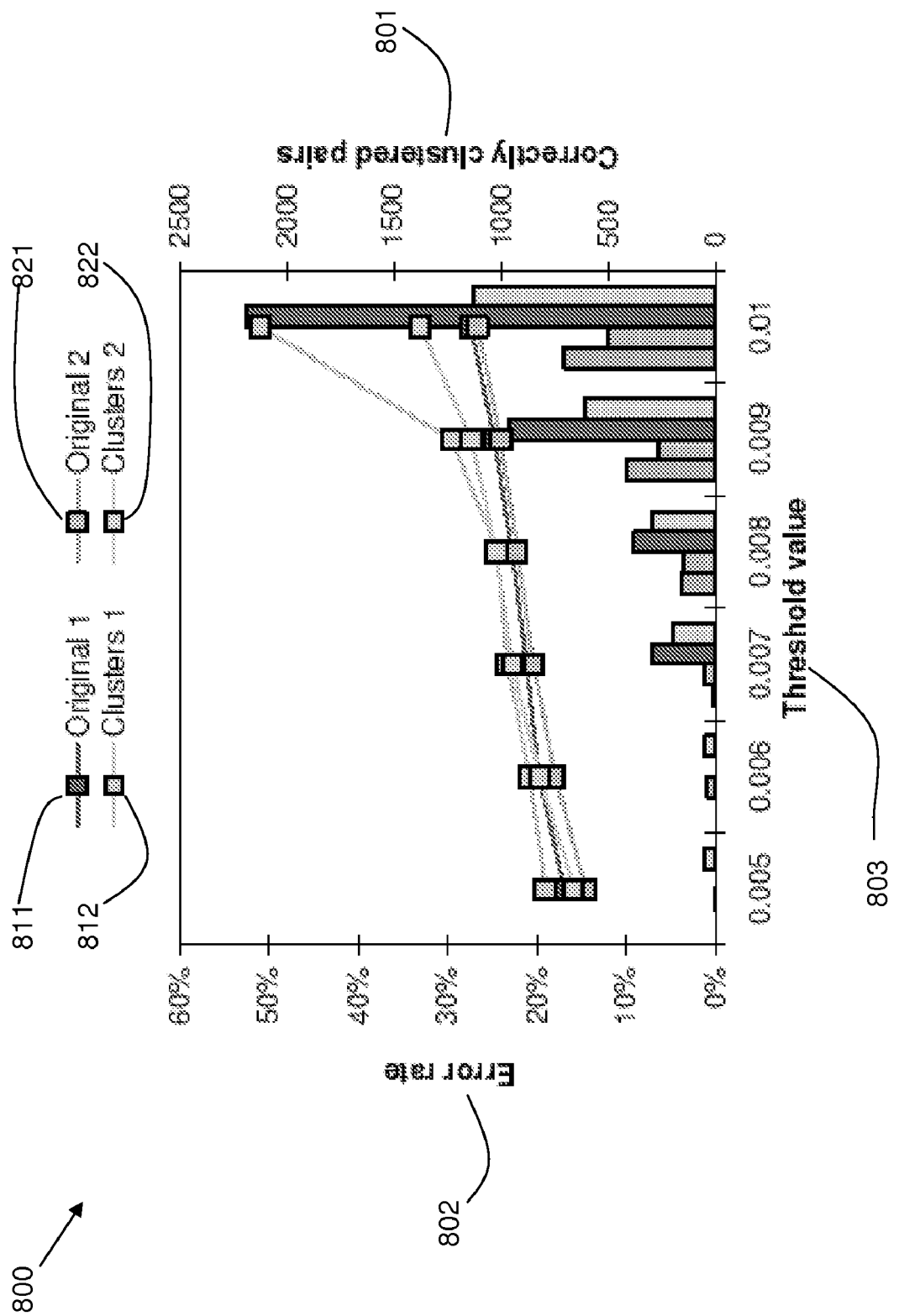
FIG. 8 is an error rate graph for clustered pairs for experimental results in accordance with the present invention.

The results of applying this algorithm using 2NCD with different thresholds on the two sample sets are given in FIG. 8. The graph 800 of FIG. 8 presents the number of correctly clustered pairs 801 along with by the error rates 802 produced by using different thresholds 803. Results are shown for sample 1 and sample 2 with the non-clustered correctly paired documents are labelled "Original" 811, 821, and the correctly clustered pairs after running the clustering script are labelled "Clusters" 812, 822. The lines show the number of correctly clustered pairs while the bars show the error rate for each cluster. The total number of same-author pairs is 2705 and 2745 in sample sets 1 and 2, respectively.

An important observation from this figure is that up to a threshold of 0.008, both error rate and the number of pairs added by the clustering algorithm are relatively small (approximately 10% or lower). This means that given a set of very similar documents, the compression distance identifies almost every pair in the set as related, with relatively few errors. At threshold 0.008, the number of clustered pairs is approximately 3/8 (37.5%) from the total number of truly related pairs. Given FIGS. 6A, 6B, 7A, 7B and 8, it is speculated that there are two types of relations between documents written by the same author. The first type consists of the cases where a person writes several Web pages with similar motivation. Since the underlying purpose of these documents is the same, and they reflect the same purpose, the resulting documents are very similar and therefore the compression distance is very low. This may explain the green slopes on the left end of FIGS. 6A and 6B. The other type of relation consists of documents which were written by the same author but serve different purposes, and as a result are deemed to be less similar. However, since the author is the same there is some resemblance between these documents, and they probably comprise the green hills which spread from compression distance 0.01 to 0.035 in FIGS. 6A and 6B. In the current method it is difficult to distinguish between document pairs of the second type and document pairs of different authors.

Applications

It is evident that the youth of today is much more likely to have authored multiple Web pages. When those young people become adults they will probably share much more content on the Web than today's adults. If this prediction is correct then the title "serial sharer" will apply to many more people around the world. Hundreds of millions of people will have their contributions stored all over the Web, managing their personal archiving and memoirs online. Search engines need to prepare for that day with a mechanism for automatically detecting and labeling such individual productivity.

Knowing that the same person authored a collection of not trivially-related pages may be used to enhance and create new applications where knowledge about users is essential. Analyzing and using information about a single author which is extracted from different sources may add new dimensions to user information, such that is not easily available today.

Analyzing the identified set of pages written by the same author may help in tailoring user profiles for personalization or for expertise location. Such user profiles may be derived from information the author chose to include in some or all of the pages.

For personalization, the profile may be modeled according to the choice of publication media and the information presented in each media; by the shared structure of the documents; by color choice; by syntactic and lexical choice; by layout decisions, by the inclusion of images, etc. Such information may be used to create user-driven defaults of color and layout choices tailored for each individual user. It may also be used to display advertisements that match the profile of who the user's readership is across all sites, which is the readership most likely to visit the documents in the set. Looking at profiling the audience of a whole site, such collections of profiles spread over several media types may help to better understand use patterns such as what information people choose to share in blogs versus what information they choose to publish on their homepage. It may also help determine the influence of individuals on a collection, to better track a community and who shapes its shared content.

For expertise location profiling the whole set may reveal and strengthen evidence for knowledge repeating itself in several documents. Also, by using link analysis techniques it may be possible to better reflect the interest the author attracts by looking at all the incoming links to the whole set of documents rather than to a single document. Analyzing social networks based on the whole set of pages written by the same author reveal different patterns than those networks found in homogenous collections consisting only of blogs or of online forum messages. Such information may serve businesses like recruiting services, online dating services, people search indices, and so on.

Serial sharers may also affect search engine ranking since a single author may produce the same idea in identical or similar forms on some or all of the published pages. This may introduce quite considerable noise to the index of a search engine that relies on any kind of host counting, link counting, term counting or even clickthrough counting. On narrow scale or esoteric topics the phenomenon may even influence content per subject.

The content contributed is not spam and should not be considered spam. Serial sharers do not produce spam, they simply use the media in the way it was intended to be used. The Web will eventually be a collection of many voices associated with many echoes. The echoes introduce noise into search engine indices. The noise may skew results retrieved for certain topics like "open source" where few people write a lot of content distributed on different hosts. There are some solutions that come to mind for using author detection to reduce noise in search engine indices. The first is similar to the idea of site collapse where results coming from the same author may be displayed in a cluster or appear after a "show more results by this author" button is pressed. Another option, is to reduce the set to a single summary file, that will represent the whole set written by the same author as a single entity in the collection. Creating a single file or a connected set of files may also help aggregate clickthrough data received for a set of same-author pages to better reflect the interest in the whole set rather than in portions of it.

A different usage for collecting the whole set of pages written by the same author is size estimation of user communities publishing on contribution based websites. This will allow for more realistic calculation of the number of unique users who contribute content to the site compared to a different site. Such a comparison may provide stronger evidence about the adoption of certain applications and the rejection of others. For example, if many a smaller hosting site is able to prove that its audience consists solely of artists who usually do not publish in any other space this makes the site unique and marketable for advertisement to art supplies companies. On the other hand, a site that has most of its authors publish similar content elsewhere has less value in terms of uniqueness and targeted marketing offerings. Owners of websites may be able to produce a seed of documents labeled with their respective authors taken from the collection and compare those samples with those of other sites. This will help create a benchmark against which user community sizing may be performed.

An author detection system alone or as part of a search system may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for processing information, comprising:
    calculating, using a computer, a compression distance between a pair of different documents that do not contain duplicated content, comprising measuring how much a respective compression of each of the documents is improved by using information included in the other of the documents, wherein said measuring comprises:
    compressing each of the documents to create first and second compressed files;
    concatenating the documents to generate a concatenated document and compressing the concatenated document to create a third compressed file;
    finding respective first and second differences in size between the first and second compressed files and the third compressed file; and
    computing a product of the first and second differences; and
    responsively to the compression distance, identifying the pair of documents as having a common author, wherein identifying the pair comprises grouping at least two of the documents between which the compression distance is below a specified threshold as belonging to the common author.

2. The method according to claim 1, wherein calculating the compression distance comprises computing the compression distance between a first document by a given author and a second document of unknown authorship, and wherein identifying the pair comprises identifying the second document as belonging to the given author.

3. The method according to claim 1, wherein calculating the compression difference comprises:
    compressing at least one of the documents to create a first compressed file;
    concatenating the documents to generate a concatenated document and compressing the concatenated document to create a second compressed file; and
    finding a difference in size between the first and second compressed files.

4. The method according to claim 1, wherein grouping the set of the documents comprises chaining together pairs of the documents between which the respective compression distances are below the specified threshold.

5. The method according to claim 1, wherein the documents have respective uniform resource locators (URLs), and wherein grouping the set of the documents comprises identifying a cluster of the documents that share a common feature in the respective URLs, and selecting the documents in the cluster for which the compression distances are below the specified threshold.

6. The method according to claim 1, and comprising deriving a user profile of the common author from the grouping of the set of the documents.

7. The method according to claim 1, comprising adjusting results provided by a certain engine responsively to the grouping of the set of the documents as belonging to the common author.

8. A computer program product comprising a computer-readable storage medium in which computer readable program code is stored, which program code, when read by a computer, causes the computer to:
    calculate a compression distance between a pair of different documents that do not contain duplicated content, by measuring how much a respective compression of each of the documents is improved by using information included in the other of the documents, wherein said measuring comprises:
    compressing each of the documents to create first and second compressed files;
    concatenating the documents to generate a concatenated document and compressing the concatenated document to create a third compressed file;
    finding respective first and second differences in size between the first and second compressed files and the third compressed file; and
    computing a product of the first and second differences; and
    identify the pair of documents as having a common author responsively to the compression distance, wherein the instructions cause the computer to compute distances between multiple documents of unknown authorship, and to group at least two of the documents between which the compression distance is below a specified threshold as belonging to the common author.

9. The product according to claim 8, wherein the instructions cause the computer to compute the compression distance between a first document by a given author and a second document of unknown authorship, and to identify the second document as belonging to the given author responsively to the compression distance.

10. The product according to claim 8, wherein the instructions cause the computer to calculate the compression difference by:
   compressing at least one of the documents to create a first compressed file;
   concatenating the documents to generate a concatenated document and compressing the concatenated document to create a second compressed file; and
   finding a difference in size between the first and second compressed files.

11. The product according to claim 8, wherein the instructions cause the computer to chain together pairs of the documents between which the respective compression distances are below the specified threshold.

12. The product according to claim 8, wherein the documents have respective uniform resource locators (URLs), and wherein the instructions cause the computer to identify a cluster of the documents that share a common feature in the respective URLs, and to select the documents in the cluster for which the compression distances are below the specified threshold.

13. The product according to claim 8, wherein the instructions cause the computer to derive a user profile of the common author from the grouping of the set of the documents.

14. A computer system, comprising:
   a memory, which is configured to store program code; and
   a processor, which is coupled to read and execute the program code so as to
   calculate a compression distance between a pair of different documents that do not contain duplicated content, by measuring how much a respective compression of each of the documents is improved by using information included in the other of the documents, wherein said measuring comprises:
      compressing each of the documents to create first and second compressed files;
      concatenating the documents to generate a concatenated document and compressing the concatenated document to create a third compressed file;
      finding respective first and second differences in size between the first and second compressed files and the third compressed file; and
   computing a product of the first and second differences; and
   identify the pair of documents as having a common author responsively to the compression distance, wherein identifying the pair comprises grouping at least two of the documents between which the compression distance is below a specified threshold as belonging to the common author.

* * * * *